United States Patent [19]

Price et al.

[11] Patent Number: 4,736,820
[45] Date of Patent: Apr. 12, 1988

[54] SELF-ENERGIZING DISC BRAKES

[75] Inventors: Anthony G. Price, Cwmbran, Wales; Roy Campbell, Bromsgrove, England; Sigma Micke, Metternich, Fed. Rep. of Germany

[73] Assignee: Lucas Industries, Wales

[21] Appl. No.: 70,615

[22] Filed: Jul. 9, 1987

Related U.S. Application Data

[63] Continuation of Ser. No. 819,819, Jan. 16, 1986, abandoned.

[30] Foreign Application Priority Data

| | | |
|---|---|---|
| Jan. 17, 1985 [GB] | United Kingdom | 8501223 |
| Feb. 4, 1985 [GB] | United Kingdom | 8502741 |
| Feb. 20, 1985 [GB] | United Kingdom | 8504393 |

[51] Int. Cl.$^4$ ............................................. F16D 55/04
[52] U.S. Cl. ............................ 188/71.4; 188/72.2; 188/72.6; 188/72.7; 192/70; 192/93 A
[58] Field of Search .................. 188/18 A, 71.4, 71.5, 188/72.2, 72.6, 72.7, 106 F, 71.3; 192/93 A, 70

[56] References Cited

U.S. PATENT DOCUMENTS

| | | | |
|---|---|---|---|
| 1,696,879 | 12/1928 | Chase | 188/71.4 X |
| 2,900,051 | 8/1959 | Hillegass | 188/71.4 |
| 4,358,002 | 11/1982 | Price et al. | 188/71.4 X |

FOREIGN PATENT DOCUMENTS

| | | | |
|---|---|---|---|
| 190828 | 8/1986 | European Pat. Off. | 188/72.7 |
| 940563 | 3/1956 | Fed. Rep. of Germany | 188/72.7 |
| 686426 | 1/1953 | United Kingdom . | |
| 986525 | 3/1965 | United Kingdom . | |
| 2130667A | 6/1984 | United Kingdom . | |

Primary Examiner—George E. A. Halvosa
Attorney, Agent, or Firm—Oldham, Oldham & Weber Co.

[57] ABSTRACT

In a disc brake of the spreading type, angular movement of the pressure plates to apply the brake is effected by a brake-applying member which co-operates with at least one of the balls comprising a rolling actuator body and located in complementary opposed recess in the two plates. The member may comprise a wedge disposed between a pair of balls and radially displaceable to separate the balls. Alternatively the balls may be received in openings in the inner ends of a pair of toggle links, or in a fitting or other member which can be withdrawn from the brake in a radial direction. In another construction a ball is received in an opening in a bell-crank lever of which one arm reacts against one of the pressure plates.

11 Claims, 8 Drawing Sheets

SELF-ENERGIZING DISC BRAKES

This is a continuation of Ser. No. 819,819, filed Jan. 16, 1986, now abandoned.

This invention relates to self-energising disc brakes of the kind in which rotatable friction discs provided with linings of friction material are adapted to be brought into engagement with spaced opposed radial surfaces in a housing by pressure plates located between the friction discs and centred by stationary pilot lugs, rolling bodies are located in pairs of complementary angularly spaced recesses in the adjacent faces of the pressure plates, and the application of the brake is initiated by moving the pressure plates angularly in opposite directions, the pressure plates then moving apart by a tendency for the rolling bodies to ride up ramps defined by the edges of at least one recess of each pair and constituting camming means, so that the pressure plates move into engagement with the friction discs which are urged into engagement with the radial surfaces, the pressure plates being carried round with the friction discs until one is arrested by the engagement of a lug on the plate with a drag-taking stop abutment in the housing, and the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

In known disc brakes of the kind set forth it is usual to apply the brake for normal service braking or parking, or in an emergency, by applying on brake-applying force to a pair of lugs a the pressure plates to urge the lugs either relatively towards, or relatively away from, each other.

In one known construction this can be achieved by the use of a pull-rod which acts on the lugs through a pair of toggle links of which the outer ends are coupled to the pull-rod and each of the inner ends is pivotally coupled to one of the lugs.

In other constructions levers, expander wedges, and cam shafts have also been successfully employed. Also such known means have required their own particular connections with the pressure plates, such as pivot pins, special machined surfaces, and locking and locating mechanisms, each with its own special interface.

In another construction disclosed in GB 986 525 the lugs are adapted to be separated by an element which is adapted to be withdrawn from the housing in a generally radial direction and balls carried by the element co-operate with radially extending recesses in the lugs which recesses converge outwardly. When the element comprises a wedge the balls may co-operate with its inclined faces to eliminate substantially all sliding friction between the wedge and the lugs.

In yet another construction disclosed in GB 686 426 a lever mounted between the pressure plates has an enlarged inner end provided in one side with a seat for a single ball received in a complementary seat in the adjacent plate, and in the opposite side with a pair of recesses complementary with similar recesses in the other pressure plate with balls housed in the recesses of each pair. The lever is angularly movable about the single ball as an axis and its engagement in the seats causes displacement of the other balls with respect to the plates and consequent relative circumferential and axial movement between the plates to initiate operation of the brake.

We are also aware of the proposal in GB-A No. 2130667 to displace one of the pressure plates radially and bodily with resect to the other to initiate the effect of the camming means.

According to our invention, in a disc brake of the kind set forth angular movement of the pressure plates in opposite directions to apply the brake is effected by the co-operation of a brake-applying member with at least one rolling actuator body in order to displace that body with respect to at least one of the plates whereby to cause the pressure plates to move apart.

The brake-applying member may act directly or indirectly on the rolling actuator body and be movable substantially in a radial direction to displace the said rolling actuator body.

Such a construction is cheap and simple to produce and the construction of the pressure plates is simplified since no actuator lugs with or without machined surfaces have to be provided for co-operation with the brake-applying member.

The brake-applying member which is disposed between the two pressure plates preferably also reacts to input a rotary motion to one of the pressure plates with respect to the other.

The brake applying member may comprise a member which extends into the brake between the two pressure plates and is provided in an inner end portion with at least one opening of complementary outline to that of the said rolling actuator body and from opposite sides of which diametrically opposed part-spherical surfaces on the rolling actuator body project for reception in superimposed recesses in the two plates.

The rolling actuator body may comprise one of the rolling bodies which constitutes part of the camming means or it may comprise, a further, separate, and additional rolling actuator body provided, specifically for initiating application of the brake.

The application of the brake may be initiated by moving the brake-applying member radially in one of two opposite inwards or outwards directions.

In one of our constructions the brake-applying member is provided with a bifurcated inner end portion of which each lug is provided adjacent to its inner end with an opening, and two of the angularly spaced rolling bodies constituting part of the camming means are received in the openings.

When the rolling actuator body or each actuator body is provided in addition to the camming means, the recesses in which the or each actuator body is received are provided with ramps inclined at angles chosen only to cause sufficient separation of the plates for application of the brake to be initiated. Otherwise, when the or each actuator body constitutes part of the camming means, the recesses have ramps chosen for efficient servo working and hence generate high threshold actuation forces.

The brake-applying member may comprise a wedge which is disposed between a pair of balls or rollers which constitute the rolling actuator bodies and is displaced in a generally radial direction to separate the balls or rollers causing them to move in a generally circumferential direction, in turn causing the plates to move simultaneously both angularly and axially with respect to each other.

In another construction a pair of the rolling bodies may each be received in an elongate opening in the outer end of a respective one of a pair of toggle links of which the outer ends are coupled to a pull rod which is displaceable in a generally radial direction to urge the rolling bodies relatively towards each other thereby effecting simultaneous relative angular and axial movement of the plates.

In yet another construction a lever includes a pocket which receives one of the rolling bodies and is provided with a cranked end which reacts against a reaction face on one of the plates, angular movement of the lever about the rolling body as an axis causing relative movement between the rolling body and that pressure plate due to the reaction of the reaction face.

Some embodiments of our invention are illustrated in the accompanying drawings in which.

Figure 1:
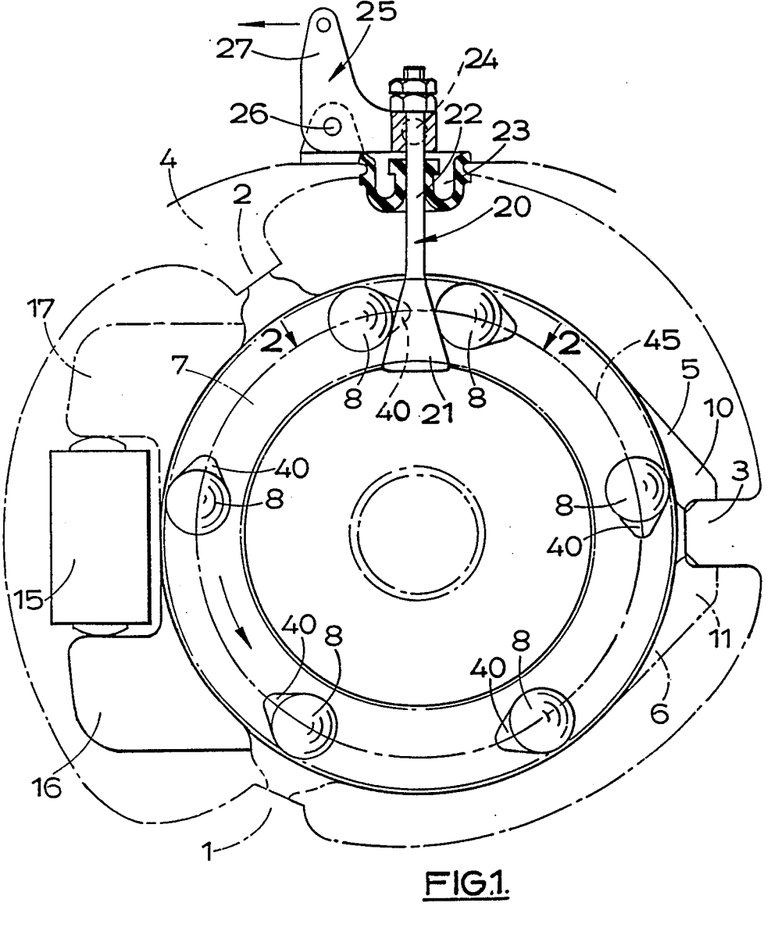
FIG. 1 is an end view of a portion of a spreading brake.
Figure 2:
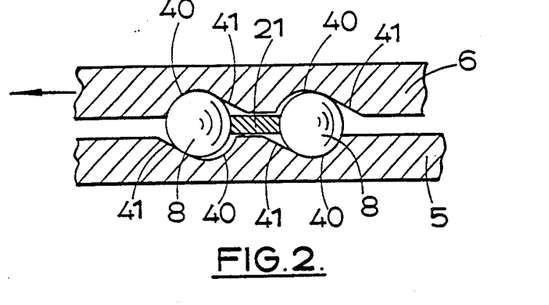
FIG. 2 is a section on the line 2—2 of FIG. 1.

The brake illustrated in FIGS. 1 and 2 of the drawings is of a conventional spreading type in which rotatable friction discs 7 provided with friction linings are adapted to be brought into engagement with spaced opposed radial surfaces in a housing 4 by pressure plates 5, 6 located between the discs and centred by three angularly spaced stationary pilots 1, 2, 3. Balls 8 comprising rolling bodies are located in co-operating oppositely inclined recesses 40 in the adjacent faces of the pressure plates 5, 6.

The application of the brake is initiated by moving the pressure plates 5, 6 angularly in opposite directions which causes the pressure plates 5, 6 to move axially relatively away from each other due to the tendency for the balls 8 to ride up ramps defining by the end faces of the recesses and define camming means. This urges the friction discs into engagement with the radial surfaces in the housing 4. The pressure plates 5, 6 are then carried round with the discs until one is arrested by the engagement of a lug 10, 11 on a respective plate with a drag-taking abutment constituted by the pilot 3.

For normal service braking the brake is applied hydraulically by an hydraulic actuator 15 which acts between lugs 16 and 17 on the respective pressure plates 5, 6.

The brake is applied mechanically for parking or in an emergency by a mechanical actuating mechanism 20 which is displaced angularly by substantially 90° with respect to the hydraulic actuator 15.

The actuating mechanism 20 comprises a wedge 21 at the inner end of a pull-rod 22. The pull-rod projects into the brake through a radial opening 23 in the housing 4, and the wedge 21 is positioned between the plates 5, 6 and between a pair of adjacent balls 8 constituting the rolling actuator bodies. The outer end of the pull-rod 22 is connected through a pivot pin 24 between a pair of limbs constituting one arm of a bifurcated bell-crank lever 25. The lever 25 is pivotally mounted on the housing 4 by means of a pivot pin 26, and a free end of its other arm 27 is connected to brake-applying means (not shown).

Angular movement of the lever 25 about the pivot 26 acts to withdraw the pull-rod 22 and the wedge 21 outwardly in a radial direction. The withdrawal of the wedge 21 causes the balls 8 of the said pair to separate and move relatively away from each other in a circumferential direction as dictated by the orientation of the recesses 40. Due to the configuration of the recesses 40 each ball 8 tends to ride up a ramp 41 defined by the edges of the recesses. This results in the two plates 5 and 6 being moved both angularly and axially simultaneously in order to initiate application of the brake.

Normally all the recesses 40 in both pressure plate 5 and 6 lie on pitch circles 45 of constant diameters. However, in a modification, the recesses in which the said pair of balls 8 are received may lie on the arc of a pitch circle of which the diameter is greater than that of the pitch circle 45 and the angles of the ramp 41 of those recesses are shallower than the remaining recesses 40. This has the effect of reducing the loading on the balls 8 of the said pair when the brake is applied.

Figure 3:
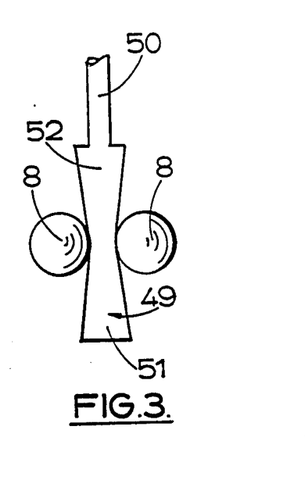
FIG. 3 is a view of another actuating member for use with the brake of FIGS. 1 and 2.

In the construction of FIG. 3 a wedge assembly 49 carried by a rod 50 comprises oppositely arranged wedges 51 and 52 of which operative faces diverge outwardly in opposite directions. This enables the balls 8 of the said pair to be separated by moving the rod 50 in a generally radial direction, either inwardly or outwardly.

Figure 4:
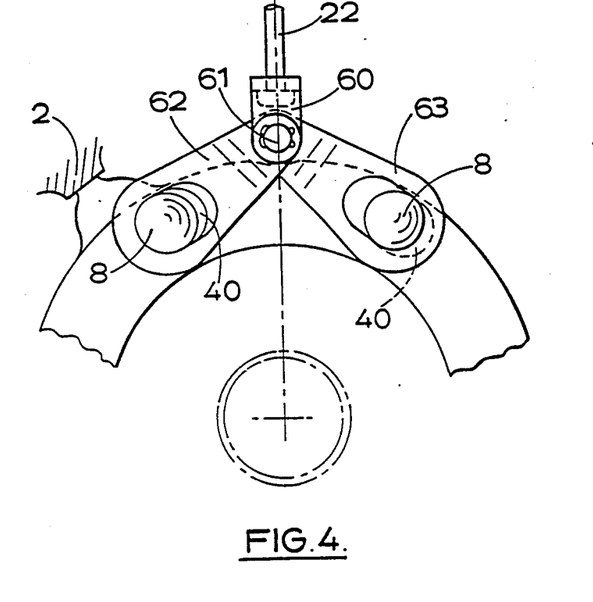
FIG. 4 is a view similar to a portion to FIG. 1 but showing a modified construction.

In the mechanical actuator of FIG. 4, the inner end of the pull-rod 22 carries a bifurcated fitting 60 which is coupled, by means of a pivot pin 61, to the outer ends of a pair of toggle links 62, 63. Elongate openings adjacent to the inner ends of the toggle links 62 and 63 receive the balls 8 of the said pair.

When the pull-rod 22 is withdrawn from the brake in a substantially radial direction the toggle links 62 and 63 are drawn towards each other, in turn to impart a similar movement to the balls received within the links 62, 63. As in the construction of FIG. 1 this results in the plates 5 and 6 being moved both angularly and axially with respect to each other to initiate operation of the brake.

Figure 5:
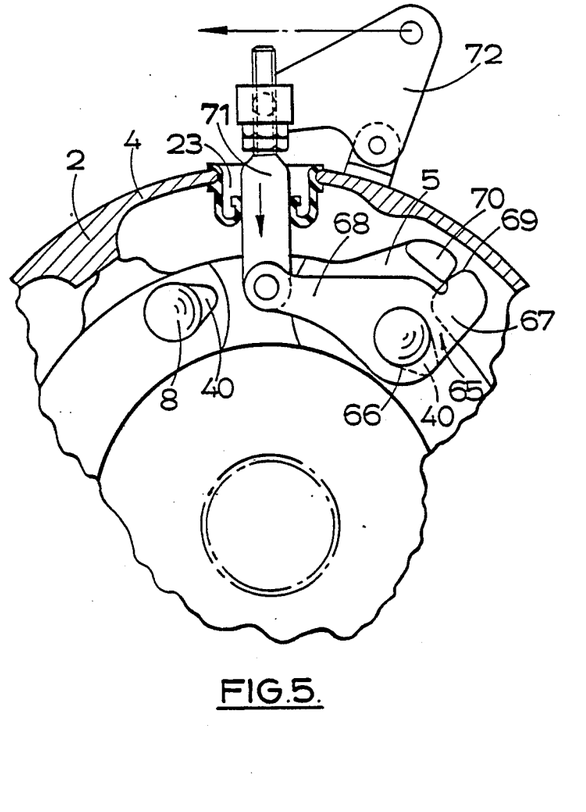
FIG. 5 is similar to FIG. 3 but showing another construction.

In the mechanical actuator of FIG. 5 a bell-crank lever 65 disposed between the plates 5 and 6 is provided with a circular opening 66 defining a pocket in which one of the balls 8 is retained. The arms 67 and 68 of the lever project in a generally outwards direction from the said one ball and the shorter arm 67 has a curved abutment face 69 in rolling engagement with a reaction lug 70 on the plate 5. A push-rod 71 adapted to be urged inwardly in a generally radial direction by angular movement of a second bell-crank lever 72 is coupled to the outer end of the longer arm 68 of the bell-crank lever 65.

When the push-rod 71 is urged inwardly in the application of the brake, due to the engagement of the arm 67 with the lug 70, angular movement of the lever 65 about the ball 8 displaces the ball 8 bodily in the recesses 40 in which it is received. Since the recesses are oppositely inclined, this results in the two pressure plates 5 and 6 moving relative to each other, simultaneously angularly and axially.

Figure 6:
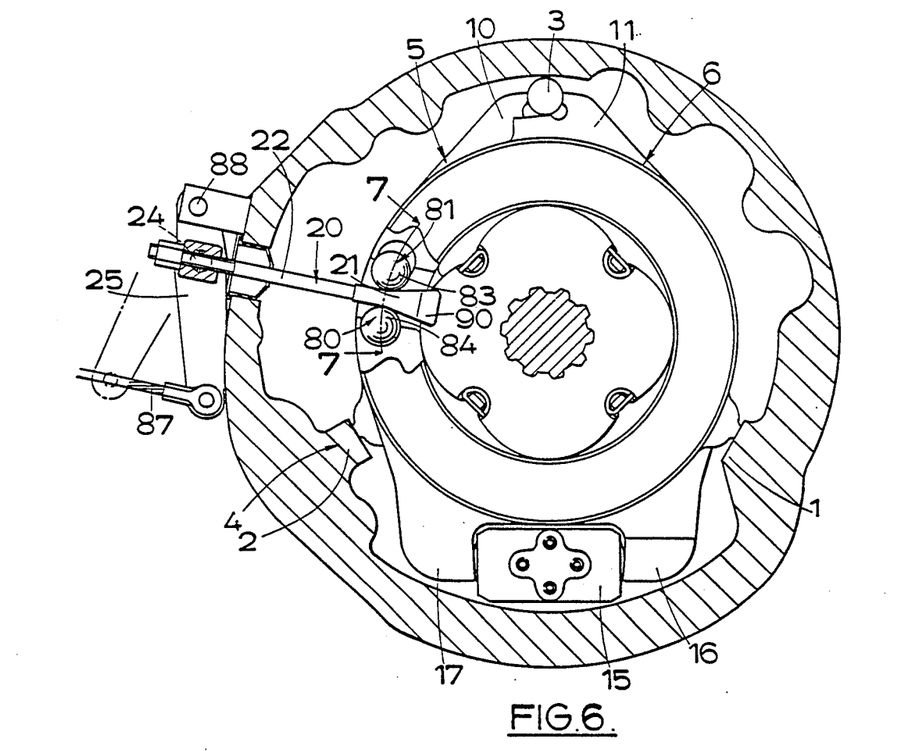
FIG. 6 is an end view similar to FIG. 1 but showing a modification.
Figure 7:
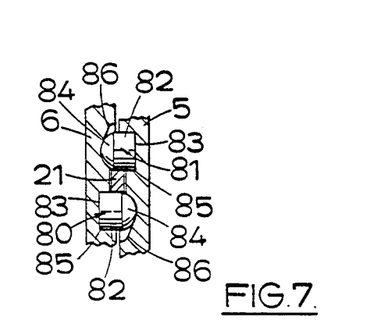
FIG. 7 is a section of the line 7—7 of FIG. 6.
Figure 8:
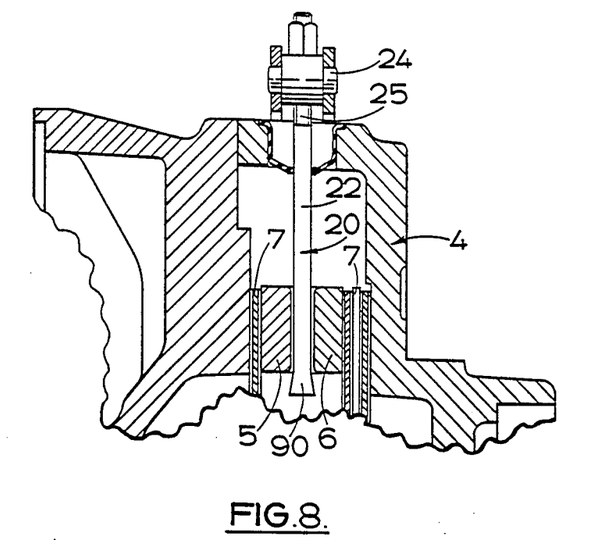
FIG. 8 is a section through the wedge actuator of FIG. 6.

In the brake illustrated in FIGS. 6, 7 and 8 of the drawings the pair of balls between which the wedge 21 is adapted to engage are replaced with rollers 80, 81 which constitute the rolling actuator bodies. Each roller 80, 81 comprises a cylindrical body 82 having opposed end faces 83 and 84 of planer and part-spherical outline, respectively. The rollers 80, 81 are oppositely arranged with their axes of rotation parallel to each other and parallel to the axis of the brake. The cylindrical bodies 82 are received in recesses 85 of cylindrical outline in respective plates 5, 6, and the part-spherical end faces 84 co-operate with recesses 86 in the other respective plate, such recesses 86 extending along arcs lying on the pitch circle upon which the other recesses lie and are of similar outline to the said other recesses.

When the brake is operated by movement of the wedge 21 in a radially outwards direction, the wedge 21 engages with the cylindrical bodies 82 with which it has rolling engagements, thereby reducing friction. The rollers 80 and 81 are separated to urge the plates 5, 6 angularly in opposite directions and simultaneously away from each other in an axial direction by the engagement of the part-spherical end faces 84 with the ramps defined by the edges of the recesses 86.

The provision of the rollers 80, 81 improves the bearing stresses and enables us to simplify the construction of the wedge 21 which can be less steep than that of the brake of FIGS. 1 and 2.

The lever 25 is straight and is coupled at its outer end to an inextensible brake-applying cable 87 and at its inner end to a pivot 88 on the housing.

The rollers 80, 81 between which the wedge 21 engages are disposed relatively close together, with the remaining balls, some four in number, being equally spaced angularly on a pitch circle of constant diameter on which the rollers 80, 81 also lie.

The wedge 21 terminates at its inner end in an axially, thickened, inwardly divergent portion 90 which maintains small clearances as the pressure plates 5 and 6 are moved relatively away from each other.

Figures 9, 10:
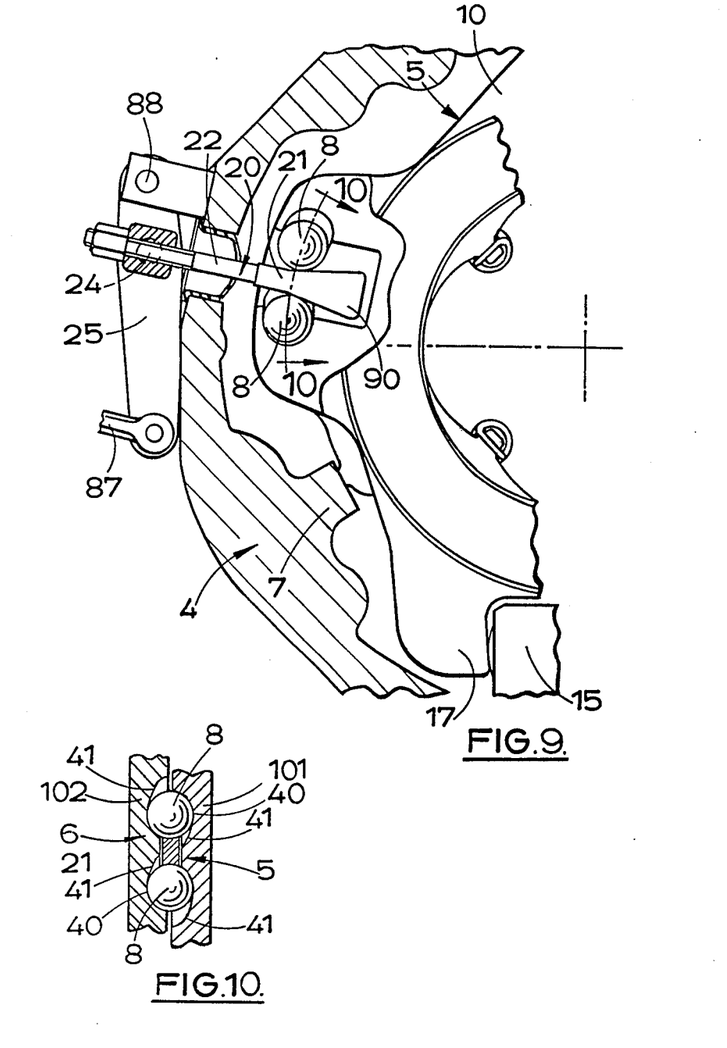
FIG. 9 is a view similar to FIG. 1 but showing another construction.
FIG. 10 is a section on the line 10—10 of FIG. 9.

In the disc brake illustrated in FIGS. 9 and 10 of the accompanying drawings, the recesses 40 in which balls 8 of the pair defining the rolling actuator bodies which are adapted to be separated by the wedge 21, are located, are positioned in lugs 101, 102 which project radially from the peripheral edges of the respective plates 5, 6. These recesses 40 lie on the arc of a pitch circle of constant diameter, and of a diameter greater than that of the pitch circle on which the other recesses in the plates 5, 6 lie.

This increased the brake-applying moment applied to the plates 5 and 6 for a given radial displacement of the wedge and, in consequence, the angles of the ramps 41 defined by the edges of the recesses 40 can be adjusted for compatibility with such increased moment.

The construction and operation of the brake of FIGS. 9 and 10 is otherwise the same as those of FIGS. 6, 7 and 8, and corresponding reference numerals have been applied to corresponding parts.

Figure 11:
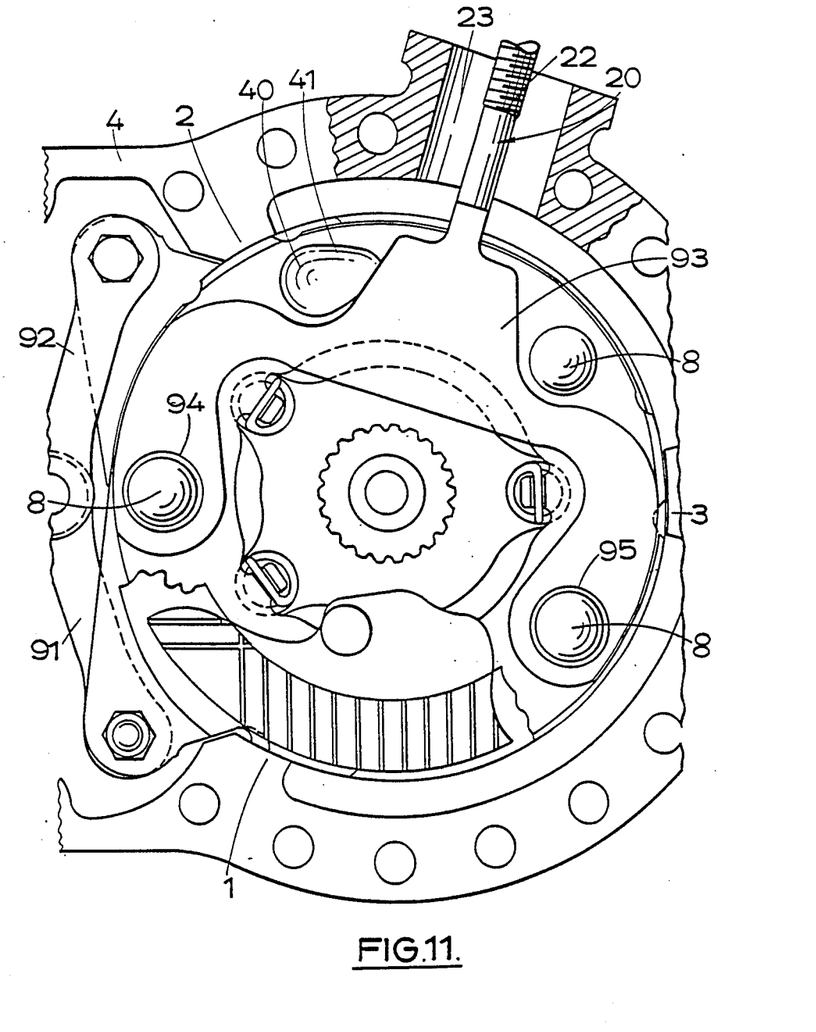
FIG. 11 is an end view of a portion of another spreading brake.

In the brake illustrated in FIGS. 11 of the drawings, for normal service braking the brake is applied by the application of a radial force to the outer end of a pair of toggle links 91 and 92 of which the outer ends are coupled to the plates 5, 6.

The brake applied mechanically for parking or in an emergency, by the mechanical actuating mechanism 20 which is displaced angularly by substantially 120° with respect to the toggle links 13, 14.

The rod 22 of the mechanism 20 which extends into the brake in a radial direction carries at its inner end a bifurcated fitting 93 which extends between two plates 5, 6. Circular openings 94, 95 adjacent to the free end of the legs of the fitting each receive one of a pair of the angularly spaced balls which constitute actuator balls.

Movement of the rod 22 in a radially inwards or outwards direction is accompanied by a corresponding movement of the said actuator balls 8 relatively away from each other in a circumferential direction as dictated by the orientation of the recesses 40 to cause relative axial and angular movement of the plates 5, 6 to initiate application of the brake as described above.

Figure 12:
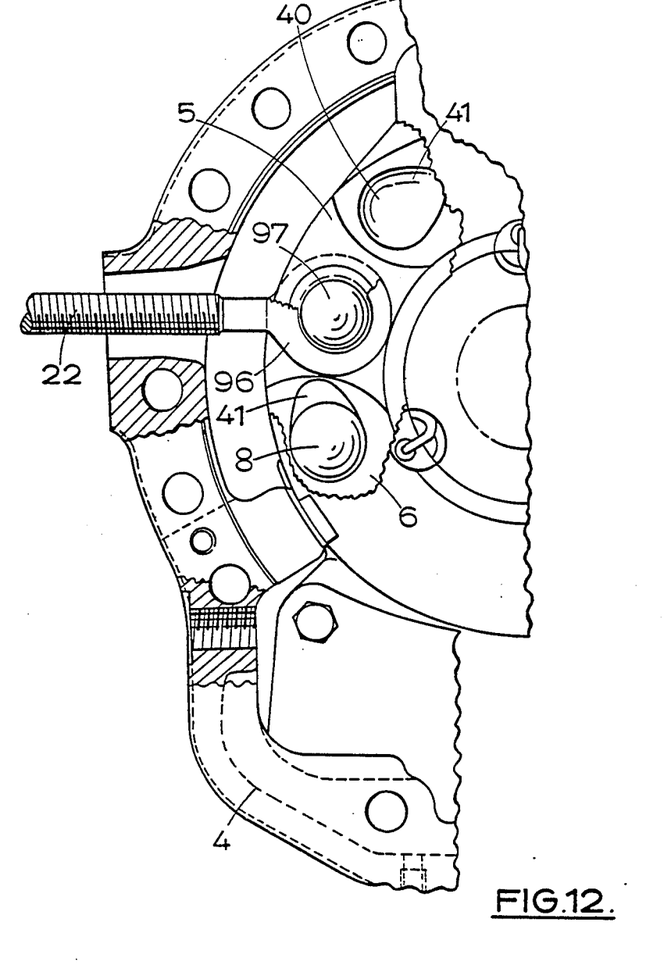
FIG. 12 is a view similar to FIG. 11 of a modified construction.
Figure 13:
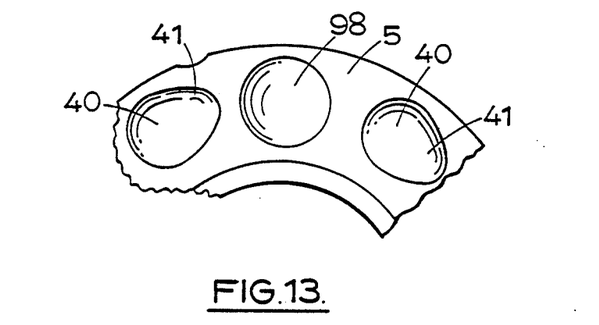
FIG. 13 is a plan view of a portion of one of the pressure plates of the brake of FIG. 12.

In the simplified construction of FIGS. 12 and 13 the bifurcated fitting 93 is omitted, and the rod 22 is provided with an end fitting 96 in the form of an eye which extends between the plates. The eye receives a single, additional, ball 97 which, in turn, is received in complementary recesses 98 in adjacent faces of the two plates 5, 6. These recesses are spaced angularly between a pair adjacent recesses 40, and the recesses 98 are of part-spherical outline.

When the rod 22 is displaced in a generally radial direction, either inwardly or outwardly, the ball 97 tends to ride out of the recesses 98. This causes sufficient axial separation of the plates 5, 6 for them to engage with the discs whereafter they are carried round with the discs and the actuation of the brake is initiated as described above.

The construction and operation of the brake of FIGS. 12 and 13 is otherwise the same as that of FIGS. 11 and corresponding reference numerals have been applied to corresponding parts.

We claim:

1. A self-energizing disc brake comprising a housing, first and second axially spaced radial surfaces in said housing, radial pilot lugs in said housing, first and second pressure plates centred on said pilot lugs, adjacent faces of said pressure plates being provided with co-operating oppositely inclined angularly spaced recesses, a first rolling body located in a first complementary pair of said recesses, a second rolling body located in a second complementary pair of said recesses and further rolling bodies located in further complementary pairs of said recesses, a rotatable friction member disposed between each said pressure plate and an adjacent radial surface, said members each comprising a disc having first and second linings of friction material carried by opposite faces of said disc, said first linings being engageable with a respective adjacent one of said pressure plates and said second linings being engageable with a respective adjacent one of said radial surfaces, and brake-applying means for moving said pressure plates angularly relative to said housing to initiate application of said brake with said pressure plates also moving axially to urge the friction members into engagement with a respective adjacent one of said radial surfaces due to a tendency for said rolling bodies to ride up ramps defined by said recesses, said recesses and said rolling bodies together constituting self-energizing camming means, said pressure plates thereafter being carried round with said friction members until a drag-taking lug on one plate engages a torque pin provided rigid with said housing to arrest the angular motion of said one plate, the other pressure plate thereafter being carried round by its respective friction member to provide a servo action, wherein said brake-applying means comprises rolling body-engaging means which extend between said pressure plates and directly engage only said first and said second of said rolling bodies each of which constitutes a part of said self-energizing camming means and each of which is contributory to producing said servo action, said brake-applying means also comprising generally radially extending actuator means in operative relationship with said rolling body engaging means whereby movement of said actuator means in a generally radial direction is transferred to said rolling body engaging means to urge said first rolling body in a generally circumferential direction and to urge said second rolling body in a generally circumferential direction, the circumferential direction in which said first rolling body is urged being in the opposite angular sense in relation to said pressure plates to that in which said second rolling body is urged, at least one of said first and second rolling bodies being displaced with respect to at least one of said recesses to cause said pressure plates initially to move axially apart and into engagement with said respective friction members whereafter said pressure plates are carried round with said friction members until the angular movement of said one plate is arrested whereafter said further rolling bodies, and said first and second rolling bodies, are displaced in their recesses to produce said servo action.

2. A disc brake as claimed in claim 1, wherein said rolling body engaging means is formed as a unitary rigid structure with said actuator means.

3. A disc brake as claimed in claim 1, wherein said rolling body engaging means reacts on said first and second rolling bodies during brake application to impart a rotary motion to one of said pressure plates with respect to the other of said pressure plates.

4. A disc brake as claimed in claim 1, wherein said rolling body engaging means comprises a member which extends into the brake between said pressure plates and is provided in an inner end portion with first and second respective openings of complementary outline to that of said first and second rolling bodies and from opposite sides of which diametrically opposed part-spherical surfaces on said first and second rolling bodies project for reception in superimposed recesses in said plates.

5. A disc brake as claimed in claim 1, wherein said actuator means is movable radially in one of two opposite inwards and outwards directions to initiate application of the brake.

6. A disc brake as claimed in claim 4, wherein said rolling body engaging means comprises a plate having a bifurcated inner end portion comprising a pair of lugs, and each said lug is provided adjacent to the inner end thereof with an opening, and wherein said first and second rolling bodies constituting part of said camming means are received in the openings.

7. A disc brake as claimed in claim 2, wherein said brake-applying means comprises a wedge which is disposed between an adjacent pair of balls or rollers one of which constitutes said first rolling body and the other of which constitutes said second rolling body, said wedge being displaced in a generally radial direction to introduce a wider portion of said wedge between said balls or rollers to separate said balls or rollers causing one of said balls or rollers to move in a first generally circumferential direction and the other of said balls or rollers to move in the opposite circumferential direction, in turn causing said plates to move simultaneously both angularly and axially with respect to each other.

8. A disc brake as claimed in claim 4, wherein said first and second rolling bodies are received in respective first and second elongate openings provided towards one end of a respective one of a pair of toggle links which constitute said rolling body engaging means, the other end of said toggle links being coupled to a pull rod which is displaceable in a generally radial direction to urge said rolling bodies relatively towards each other thereby effecting simultaneous relative angular and axial movement of the plates.

9. A disc brake as claimed in claim 1 in which said first and second rolling bodies are located in adjacent angularly spaced recesses.

10. A disc brake as claimed in claim 1 in which said first and second complementary pairs of recesses are symmetrically disposed about the radial line of said actuator means.

11. A self-energising disc brake comprising a housing, first and second axially spaced radial surfaces in said housing, radial pilot lugs in said housing, first and second pressure plates centred on said pilot lugs, adjacent faces of said pressure plates being provided with co-operating oppositely inclined angularly spaced recesses, a first rolling body located in a first complementary pair of said recesses, a second rolling body located in a second complementary pair of said recesses and further rolling bodies located in further complementary pairs of said recesses, a rotatable friction member disposed between each said pressure plate and an adjacent radial surface, said members each comprising a disc having first and second linings of friction material carried by opposite faces of said disc, said first linings being engageable with a respective adjacent one of said pressure plates and said second linings being engageable with a respective adjacent one of said radial surfaces, and brake-applying means for moving said pressure plates angularly relative to said housing to initiate application of said brake with said pressure plates also moving axially to urge the friction members into engagement with a respective adjacent one of said radial surfaces due to a tendency for said rolling bodies to ride up ramps defined by said recesses, said recesses and said rolling bodies together constituting self-energising camming means, said pressure plates thereafter being carried round with said friction members until a drag-taking lug on one plate engages a torque pin provided rigid with said housing to arrest the angular motion of said one plate, the other pressure plate thereafter being carried round by its respective friction member to provide a servo action, wherein said brake-applying means comprises a wedge member which extends between said pressure plates within the plan projection of said pressure plates and is provided with opposed first and second cam surfaces which respectively directly engage only said first and said second of said rolling bodies, each of which constitutes a part of said self-energising camming means and each of which is contributory to producing said servo action, radial movement of said wedge member introducing a wider part of said wedge member between said first and second rolling bodies to urge said first rolling body circumferentially in one direction into engagement with a first abutment surface on one of said pressure plates provided part-defining one of the recesses of said first pair of recesses, and urging said second rolling body circumferentially in the opposite direction into engagement with a second abutment surface on the other of said pressure plates provided part-defining the one of said second pair of recesses that is in the other pressure plate, whereby the distance between said first and second abutment surfaces is increased by further radial movement of said wedge member to move said pressure plates angularly with respect to each other to initiate brake application.

* * * * *

UNITED STATES PATENT AND TRADEMARK OFFICE
CERTIFICATE OF CORRECTION

PATENT NO. : 4,736,820
DATED : April 12, 1988
INVENTOR(S) : Price et al.

It is certified that error appears in the above—identified patent and that said Letters Patent is hereby corrected as shown below:

On the title page assignee should read

--- [73] Assignee: Lucas Industries public limited company Birmingham, England ---.

Signed and Sealed this

First Day of August, 1989

Attest:

DONALD J. QUIGG

*Attesting Officer*      Commissioner of Patents and Trademarks